United States Patent
Gadkaree et al.

(10) Patent No.: US 9,928,969 B2
(45) Date of Patent: Mar. 27, 2018

(54) METHOD OF PRE-DOPING A LITHIUM ION CAPACITOR

(71) Applicant: Corning Incorporated, Corning, NY (US)

(72) Inventors: Kishor Purushottam Gadkaree, Painted Post, NY (US); Rahul Suryakant Kadam, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 15/684,050

(22) Filed: Aug. 23, 2017

(65) Prior Publication Data

US 2017/0352496 A1    Dec. 7, 2017

Related U.S. Application Data

(62) Division of application No. 14/836,099, filed on Aug. 26, 2015, now Pat. No. 9,779,885.

(51) Int. Cl.
*H01G 11/50* (2013.01)
*H01G 11/84* (2013.01)
(Continued)

(52) U.S. Cl.
CPC .......... *H01G 11/50* (2013.01); *H01G 11/06* (2013.01); *H01G 11/14* (2013.01); *H01G 11/38* (2013.01);
(Continued)

(58) Field of Classification Search
CPC ........ H01G 11/86; H01G 11/06; H01G 11/22; H01G 11/38; H01G 11/46; H01G 11/50; H01G 11/60; H01G 11/62; H01G 11/78
See application file for complete search history.

(56) References Cited

U.S. PATENT DOCUMENTS

| 8,920,925 | B2 | 12/2014 | Gadkaree et al. |
| 9,607,778 | B2 * | 3/2017 | Gadkaree ............... H01G 11/06 |

(Continued)

FOREIGN PATENT DOCUMENTS

| EP | 2682966 A1 | 1/2014 |
| EP | 2958122 A1 | 12/2015 |

(Continued)

OTHER PUBLICATIONS

International Search Report and Written Opinion PCT/US2016/048102 dated 11/7/1.

(Continued)

*Primary Examiner* — Dion R Ferguson
(74) *Attorney, Agent, or Firm* — John L. Haack

(57) ABSTRACT

A method for pre-doping a lithium ion capacitor, including:
compressing a lithium ion capacitor of the formula:

C/S/A/S/C/S/A/S/C, where:
/A/ is an anode coated on both sides with an anode carbon layer, and each anode carbon layer is further coated with lithium composite powder (LCP) layer;
C/ is a cathode coated on one side with a layer of an cathode carbon mixture; and
S is a separator; and
a non-aqueous electrolyte; and
conditioning the resulting compressed lithium ion capacitor, for example, at a rate of from C/20 to 4C, and the conditioning redistributes the impregnated lithium as lithium ions in the anode carbon structure. Also disclosed is an carbon coated anode having lithium composite powder (LCP) layer compressed on the carbon coated anode.

3 Claims, 5 Drawing Sheets

(51) Int. Cl.
  *H01G 11/14* (2013.01)
  *H01G 11/38* (2013.01)
  *H01G 11/06* (2013.01)
  *H01G 11/86* (2013.01)

(52) U.S. Cl.
  CPC ............ *H01G 11/84* (2013.01); *H01G 11/86* (2013.01); *Y02E 60/13* (2013.01)

(56) References Cited

U.S. PATENT DOCUMENTS

| | | | |
|---|---|---|---|
| 9,779,885 B2 * | 10/2017 | Gadkaree | H01G 11/50 |
| 2008/0165471 A1 | 7/2008 | Kojima et al. | |
| 2010/0027193 A1 * | 2/2010 | Marumo | H01G 11/12 361/505 |
| 2012/0050952 A1 | 3/2012 | Choi et al. | |
| 2012/0063059 A1 | 3/2012 | Ra et al. | |
| 2012/0100437 A1 | 4/2012 | Nakahara et al. | |
| 2012/0212879 A1 | 8/2012 | Li et al. | |
| 2013/0070391 A1 | 3/2013 | Zheng | |
| 2013/0194721 A1 | 8/2013 | Cho et al. | |
| 2013/0201606 A1 | 8/2013 | Nansaka et al. | |
| 2013/0202945 A1 | 8/2013 | Zhamu et al. | |
| 2014/0106191 A1 | 4/2014 | Itaya et al. | |
| 2014/0134438 A1 | 5/2014 | Gadkaree et al. | |
| 2014/0146440 A1 | 5/2014 | Gadkaree et al. | |
| 2014/0177136 A1 | 6/2014 | Kim et al. | |
| 2014/0234711 A1 | 8/2014 | Rojeski | |
| 2014/0293507 A1 | 10/2014 | Gadkaree et al. | |
| 2014/0313639 A1 | 10/2014 | Raman et al. | |
| 2016/0225536 A1 | 8/2016 | Gadkaree et al. | |
| 2016/0225540 A1 | 8/2016 | Gadkaree et al. | |

FOREIGN PATENT DOCUMENTS

| | | |
|---|---|---|
| JP | 2005302300 A | 10/2005 |
| JP | 2009272585 A | 11/2009 |
| WO | 2013012521 A1 | 1/2013 |

OTHER PUBLICATIONS

Lastoshie et al. "Pore size distribution analysis of microporous carbons: a density functional theory approach", J. Phys. Chem. 1993, 97. pp. 4786-4796.

Liu et al. "Particles and polymer binder interaction: A controlling factor in lithium-ion electrode performance", Journal of the Electrochemical Society 159 (3) pp. A214-A221 (2012).

Sivakkumar et al. "Evaluation of lithium-ion capacitors assembled with pre-lithiated graphite anode and activated carbon cathode", Electrochimica Acta 65 (2012) 280-287.

Chang et al. "The influence of different electrode fabrication methods and poly(vinylidene flouride) binders on the anode electrode dimension stability and cyclability in lithium-ion batteries" Journal of new materials for Electrochemical Systems 11, pp. 43-47 (2008).

Yoo et al. "Interaction of Poly(vinylidene flouride) with graphite particles. 1. Surface morphology of a composite film and its relation to proccessing parameters" Chem. Mater. 2003, 15, pp. 850-861.

Yoo et al. "Interaction of Poly(vinylidene flouride) with graphite particles. 2. Effect of solvent evaporation kinetics and chemical properties of PVDF on the surface morphology of a composite film and its relation to electrochemical performance", Chem. Mater. 2004, 16, pp. 1945-1953.

* cited by examiner

METHOD OF PRE-DOPING A LITHIUM ION CAPACITOR

This application is a divisional of U.S. patent application Ser. No. 14/836,099 filed on Aug. 26, 2015, the entire disclosure of which are incorporated herein by reference.

CROSS-REFERENCE TO RELATED CO-PENDING APPLICATIONS

The present application is related to commonly owned and assigned U.S. Ser. No. 14/610,782, filed Jan. 30, 2015, entitled "ANODE FOR LITHIUM ION CAPACITOR"; Ser. No. 13/673,019, filed Nov. 9, 2012, entitled "LITHIUM COMPOSITE PARTICLES," and Ser. No. 14/493,886, filed on Sep. 23, 2014, entitled "ENCAPSULATED LITHIUM PARTICLES AND METHODS OF MAKING AND USE THEREOF," but does not claim priority thereto.

The entire disclosure of each publication or patent document mentioned herein is incorporated by reference.

BACKGROUND

The disclosure generally relates to the field of energy storage devices.

SUMMARY

In embodiments, the disclosure provides a lithium ion capacitor (LIC) article and a method of pre-doping the lithium ion capacitor article.

BRIEF DESCRIPTION OF THE DRAWINGS

In embodiments of the disclosure.

DETAILED DESCRIPTION

Figure 1:
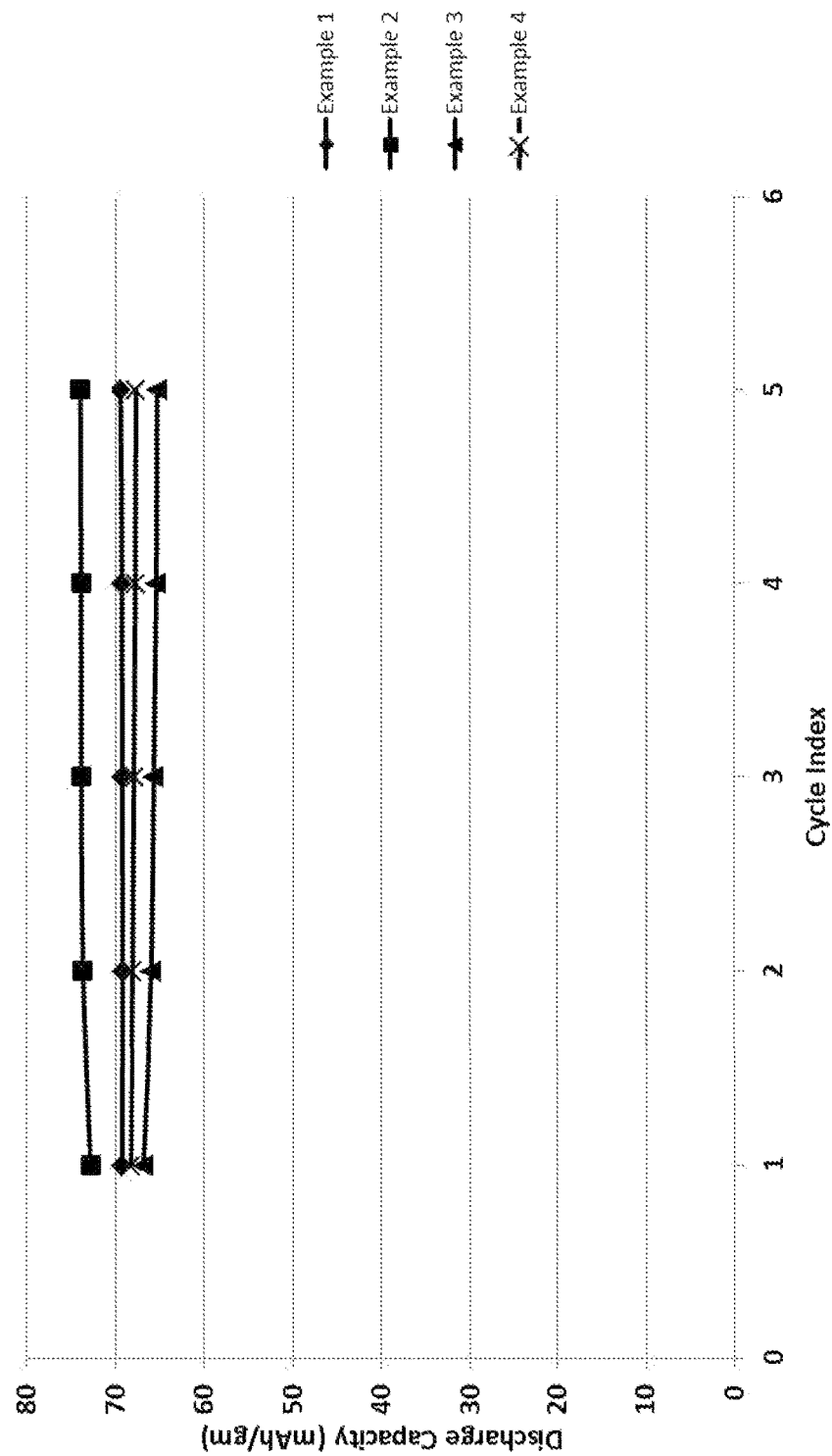
FIG. 1 shows conditioning cycles at C/2, C/10, C/20, and 1C rates for the working Examples 1 to 4.

Various embodiments of the disclosure will be described in detail with reference to drawings, if any. Reference to various embodiments does not limit the scope of the invention, which is limited only by the scope of the claims attached hereto. Additionally, any examples set forth in this specification are not limiting and merely set forth some of the many possible embodiments of the claimed invention.

In embodiments, the disclosed method of making and using provide one or more advantageous features or aspects, including for example as discussed below. Features or aspects recited in any of the claims are generally applicable to all facets of the invention. Any recited single or multiple feature or aspect in any one claim can be combined or permuted with any other recited feature or aspect in any other claim or claims.

Definitions

"Pre-doping," "pre-doped," or like terms refers to a process including: a first compression step where a source of lithium ions, for example, a LCP, is impregnated or inserted into the anode carbon structure via mechanical compression, atmospheric compression, or like compressive force; and a second conditioning step which includes fast charging and discharging to redistribute lithium ions from the lithium source throughout at least a portion of the anode carbon structure.

"Compressing," "compression," "compress," "press," or like terms refers to applying a suitable pressure force to all or a portion of a nascent lithium ion capacitor, such as a fully constructed LIC or the anode portion of the LIC with or without liquid electrolyte present. Although not bound by theory, it is believed that the compressing causes the anode carbon in the lithium ion capacitor to be doped or impregnated with the source of lithium ions.

"Conditioning," "condition," or like terms refers to constant current charging and discharging of the lithium ion capacitor at a given C-rate with a constant voltage hold between every constant current charge and discharge step to redistribute the impregnated or inserted source of lithium ions, or lithium ions from the source, uniformly therein and increases the voltage up to, for example, 3V.

"Shorting," "short," "short circuit," or like terms refers to the insertion of lithium ions into the anode carbon structure via application of a suitable mechanical pressure, atmospheric, or like force.

"Open circuit voltage," "OCV," "open voltage," or like terms refers to voltage between two electrodes when the two electrodes are not connected and no external current is passing through the circuit.

"Charging rate," "C-rate," "C-rate of current," or like terms refers to a measure of the theoretical rate at which a capacitor is fully charged or fully discharged relative to its maximum capacity. As examples, a 1C rate means that the discharge current will discharge the capacitor in 1 hr to a given voltage, a C/2 rate means that the discharge current will discharge the capacitor in 2 hrs to a given voltage, 2C rate means that the discharge current will discharge the capacitor in 30 mins to a given voltage, a C/10 rate means that the discharge current will discharge the capacitor in 10 hrs to a given voltage, and a C/20 rate means that the discharge current will discharge the capacitor in 20 hrs to a given voltage.

"Lithium ion capacitor," "LIC," or like terms refer to a hybrid type of capacitor related to a supercapacitor energy storage device. A hybrid type of capacitor is capable of storing charge electrostatically and electrochemically. Activated carbon can be used as cathode. The anode of the LIC can be a carbon material which can intercalate lithium ions from a source of lithium ions. The pre-doping method reduces the potential of the anode and allows a relatively high output voltage (e.g., from 3 to 4.2 V) compared to other supercapacitors. Unlike electrochemical double layer capacitors (EDLC's) which store energy based on a charge double layer mechanism on both electrodes, a hybrid lithium ion capacitor stores energy on the cathode via the charge double layer mechanism whereas energy storage on anode is via a faradaic mechanism. As a result, the energy density in such devices can be, for example, five times higher than an EDLC, while maintaining the power at about three to four times that of the EDLC. In spite of the faradaic mechanism of energy storage, these devices still show very high cycle life in excess of 200,000 cycles, making the devices attractive for many applications. LICs utilize a high surface area (typically greater than 1000 m²/g) carbon on the positive electrode, and an intercalating carbon with low porosity and low surface area (typically less than 300 m²/g) on the anode, which electrode disposition supports the fast chemical intercalation and de-intercalation of lithium ions. During charge and discharge, lithium intercalation and de-intercalation occurs within the bulk of the negative electrode, whereas anion adsorption and desorption takes place on the positive electrode. The adsorption and desorption on the positive electrode is a non-faradaic reaction which is relatively faster than the lithium ion intercalation and de-intercalation on the negative electrode. Since the lithium ions contained in the electrolyte are not sufficient for the operation of the device, a lithium ion source is needed. This extra lithium ion source in a lithium ion capacitor can be made available by inserting lithium metal in the negative/anode electrode. Commercially, a lithium metal foil is short circuited with the negative/anode electrode to insert the lithium into the negative/anode electrode in the lithium ion capacitor. This approach necessitates use of a lithium metal electrode in the device creating many safety issues. Alternatively, the lithium metal from the lithium foil may also be electrochemically pre-inserted in the negative/anode electrode. However, the short circuit with lithium foil and the electrochemical technique can be intricate and tedious, and is not a preferred method because of, for example, the time and complexity.

"Anode," "anode electrode," "negative electrode," or like terms refers to an electrode through which positive electric charge flows into a polarized electrical device and electrons flow out of the electrode to an outside circuit.

"Cathode," "cathode electrode," "positive electrode," or like terms refers to an electrode from which positive electric charge flows out of a polarized electrical device.

"Activated carbon," "active carbon," or like terms refers to a carbon derived from a synthetic or natural organic source by first creating a char in an inert environment followed by reacting the carbon char with an oxidizing agent, for example, steam or $CO_2$, or alternately, treating the char with an alkali compound such as KOH, NaOH, and like alkali compounds, or an acid such as phosphoric acid. The alkali or acid treatment oxidizes the carbon char and creates fine porosity having a large surface area. The treated carbon provides an energy storage material capable of having a double layer storage mechanism.

"Include," "includes," or like terms means encompassing but not limited to, that is, inclusive and not exclusive.

"About" modifying, for example, the quantity of an ingredient in a composition, concentrations, volumes, process temperature, process time, yields, flow rates, pressures, viscosities, and like values, and ranges thereof, or a dimension of a component, and like values, and ranges thereof, employed in describing the embodiments of the disclosure, refers to variation in the numerical quantity that can occur, for example: through typical measuring and handling procedures used for preparing materials, compositions, composites, concentrates, component parts, articles of manufacture, or use formulations; through inadvertent error in these procedures; through differences in the manufacture, source, or purity of starting materials or ingredients used to carry out the methods; and like considerations. The term "about" also encompasses amounts that differ due to aging of a composition or formulation with a particular initial concentration or mixture, and amounts that differ due to mixing or processing a composition or formulation with a particular initial concentration or mixture.

"Optional" or "optionally" means that the subsequently described event or circumstance can or cannot occur, and that the description includes instances where the event or circumstance occurs and instances where it does not.

The indefinite article "a" or "an" and its corresponding definite article "the" as used herein means at least one, or one or more, unless specified otherwise.

Abbreviations, which are well known to one of ordinary skill in the art, may be used (e.g., "h" or "hrs" for hour or hours, "g" or "gm" for gram(s), "mL" for milliliters, and "rt" for room temperature, "nm" for nanometers, and like abbreviations).

Specific and preferred values disclosed for components, ingredients, additives, dimensions, conditions, times, and like aspects, and ranges thereof, are for illustration only; they do not exclude other defined values or other values within defined ranges. The composition and methods of the disclosure can include any value or any combination of the values, specific values, more specific values, and preferred values described herein, including explicit or implicit intermediate values and ranges.

In embodiments, the present disclosure provides a lithium ion capacitor (LIC) and a method of pre-doping the lithium ion capacitor.

In embodiments, the present disclosure provides an LIC having improved energy density and power density performance, of up to 100%, when the disclosed pre-doping method is accomplished at faster rates compared to conventional pre-doping methods. The disclosure provides a rapid pre-doping method including: compressing a newly constructed LIC so that lithium ions are inserted in the anode carbon structure; and followed by conditioning the resulting compressed LIC, which includes fast charge and discharge to redistribute the lithium ions throughout the anode carbon structure.

A lithium ion capacitor ("cell") is a high power device, and the fast charge and fast discharge is one of the attributes which an energy storage capacitor should possess. In the lithium ion capacitor the negative electrode (intercalating and de-intercalating) is pre-doped with lithium. The pre-doping of the lithium ion capacitor allows an increase in the voltage to approximately about 3.8 volts and thus also increases the energy density of the lithium ion capacitor. The cell capacitance ($C=Q/V$) can characterized by the charge-discharge curve. Since the energy density and power density are both proportional to the square of the voltage there is a significant increase in energy density and power density of the device. In addition to the voltage related increase, the faradaic reaction also has significantly higher energy associated with it and contributes to an increase in energy density and power density. The negative electrode stays at a constant or even potential during the charging and discharging of the cell.

Since the negative electrode of an LIC is impregnated with lithium, it becomes necessary for the cell to be conditioned to equilibrate the lithium in the intercalating negative electrode carbon. For optimum performance of the electrode it is necessary to soak the electrodes with electrolyte. The equilibration and soaking of the electrodes with electrolyte is achieved by the conditioning step. Generally, during the conditioning step the capacitor device is charged at a constant current at a given C rate and discharged at a constant current at a given C-rate. C-rates are the charge rates at which cells are charged or discharged. A C-rate is a measure of the rate at which a battery or a capacitor is discharged relative to its maximum capacity. A 1C rate means that the discharge current will discharge the entire battery in 1 hr.

Generally, pre-doping is carried out at slow charge-discharge rates. The pre-doping is required in the manufacturing process and has to be carried out for every cell. Pre-doping contributes significantly to the manufacturing cost in addition to its effect on the performance of the cell. A pre-doping method has recently published, see for example, US Published Patent Application US 2014/0313639, which mentions the pre-doping of the cell at from C/72 to C/144 rate at constant current, which suggests the charging is complete in from 72 to 144 hrs.

In embodiments, the disclosure provides a lithium ion capacitor where the pre-doping is accomplished very fast or in a relatively short time, and calls for only from 1 to 20 hrs compared to, for example, 72 to 144 hrs required in prior art processes. The disclosed pre-doping process can provide significant cost saving advantages in the manufacturing of an LIC device.

In embodiments, the present disclosure provides a LIC, and a method of making the LIC. In embodiments, a lithium ion source comprising a layer of stable encapsulated lithium composite particles (LCP) on the surface of a carbon coated anode, can be impregnated or inserted into the carbon surface coating by compressing, such as applying pressure, to provide a source of lithium ion on the surface of the anode. A subsequent conditioning step redistributes the lithium ions from the lithium ion source into the carbon coated anode.

In embodiments, the disclosure provides a lithium ion capacitor pre-doping method, which can be accomplished with a rapid compression and conditioning cycle, which inventive method is significantly faster than the method described in the literature (see e.g., US Published Patent Application US 2014/0313639, supra.). The pre-doping can be accomplished by compressing a lithium composite particle powder into a carbon coated anode electrode, for example, under mechanical pressure at atmospheric pressure. The impregnation by compression of lithium metal into the carbon coated anode electrode of the lithium ion capacitor affords an increase in the voltage, for example, to about 2.8 to 3.0 volts.

Next, the conditioning step can be accomplished either electrochemically or thermally. In electrochemical conditioning the cell is subjected to, for example, at least one cycle, such as 1 to 20 cycles, where the cell is charged at, for example, a C/2 rate from an OCV to 3.8V, held at 3.8V for 1 hr, and then discharged at a C/2 rate. In thermal conditioning the cell can be subjected to, for example, heating at temperatures from 40 to 70° C. for from 2 to 10 hrs. Conditioning assists uniform equilibration of the intercalated lithium throughout the carbon coated anode electrode after compression. Conditioning of the cell is a significant step that leads to the opening of the carbon pores and penetration of the electrolyte into the deepest pores available in the carbon coated electrodes. The conditioning also allows for the complete wetting of the carbon with the electrolyte. In the first cycle of conditioning there is formation of a solid electrolyte interphase (SEI). Solid electrolyte interphase is a film formed due to the irreversible reactions of the lithium and the electrolyte solvent(s) with the carbon surface. The SEI can play a role in protecting the electrolyte from coming into further contact with the reactive carbon surface and undergoing further unwanted reactions in the cell. The SEI is also responsible for the long term stability (aging) of the cell. The current applied during the conditioning cycles has a direct effect on the quality of the SEI since the current will control the rate of the reactions. Given the nature of the disclosed pre-doping method, which includes insertion of lithium ions in the anode carbon under compression and conditioning, the conditioning step is preferably accomplished to achieve best possible performance.

In the present disclosure, a lithium ion capacitor having a hard carbon based anode and an activated carbon cathode can be pre-doped with lithium by first compressing a carbon coated anode having an LCP surface coating in from about 1 to 30 mins, and then conditioned in from about 15 mins to 20 hrs. In embodiments, the compressed LIC can be charged and discharged during conditioning at a rate, for example, of from C/20 to 2C, for example, C/20, C/10, C/5, C/4, C/3, C/2, 1C, 2C, 3C, or 4C, including intermediate ranges and values. In the disclosed method, the pre-doping time can be reduced to, for example, as low as about 1.5 hrs, such as from about 45 mins to 2 hrs.

In embodiments, the LCP coated carbon coated anode can first be compressed according the disclosed methods. The first compressed anode can then be assembled into a complete LIC. The complete LIC can then be conditioned according the disclosed methods to provide a pre-doped LIC having performance properties comparable to the above-mentioned LIC that was instead first compressed and then conditioned.

In embodiments, the present disclosure provides a method for pre-doping a lithium ion capacitor, comprising:
compressing a lithium ion capacitor of the formula:

C/S/A/S/C/S/A/S/C, where:
/A/ is an anode coated on both sides with an anode carbon layer, and each anode carbon layer is further coated with lithium composite particle powder (LCP) layer;
C/ is a cathode coated on one side with a layer of an cathode carbon mixture; and
S is a separator; and
a non-aqueous electrolyte; and
conditioning the resulting compressed lithium ion capacitor, for example, at a rate of from C/20 to 4C wherein conditioning redistributes the impregnated lithium as lithium ions in the anode carbon structure.

In embodiments, compressing can be accomplished, for example, at a pressure of from about 50 to 1000 psi for from about 0.1 to 100 minutes, including intermediate values and ranges.

In embodiments, compressing can be accomplished, for example, at a pressure of from 220 to 650 psi for from 1 to 45 minutes.

Although not bound by theory, it is believed that the compressing electrically shorts the lithium composite powder with the anode electrode.

In embodiments, conditioning can be accomplished, for example, electrochemically or thermally, in from about 15 mins to 20 hrs.

In embodiments, conditioning can be accomplished, for example, electrochemically in at least one cycle where the compressed lithium ion capacitor is charged at a C/2 rate from an OCV to 3.8V, held at 3.8V for 1 hr, and then discharged at a C/2 rate.

In embodiments, the at least one cycle can be, for example, from 1 to 20 cycles.

In embodiments, conditioning can be accomplished, for example, thermally by heating or irradiating, by any suitable means or method, the compressed lithium ion capacitor to from 40 to 70° C. for from 2 to 10 hrs.

In embodiments, the compressing and conditioning produces an LIC having, for example, a discharge capacity of from at least 60 mAh/gm and an energy density of from at least 30 Wh/l at 1C discharge rate.

In embodiments, the anode can be, for example, a hard carbon and the cathode can be, for example, an activated carbon. In the disclosed pre-doping method including compressing and conditioning, the cycle time can be reduced to, for example, as low as 1.5 hrs compared to conventional conditioning cycles of, for example, from 50 to 100 hrs.

In embodiments, the conditioning by, for example, fast charge and fast discharge, inserts lithium ions in the carbon of the coated anode.

In embodiments, the conditioning of the resulting compressed lithium ion capacitor can be accomplished, for example, at a rate of from C/20 to 4C.

In embodiments, the conditioning redistributes the impregnated lithium as lithium ions in the anode carbon structure.

In embodiments, the disclosure provides an anode in a lithium ion capacitor, comprising:
an electrically conductive substrate, for example, a copper or aluminum foil or sheet, graphite, graphene, and like conductors;
a carbon composition comprising:
a high temperature carbon, i.e., processed at from 1000 to 1700° C., including intermediate values and ranges, as disclosed in the aforementioned U.S. Ser. No. 14/610,782, in from 85 to 95 wt %;
a conductive carbon in, for example, from 1 to 8 wt %; and
a conductive binder in, for example, from 3 to 10 wt %, based on the total weight of the carbon composition; and
a lithium composite particle powder (LCP) in, for example, from 0.25 to 0.3 wt %, based on the total weight of the carbon composition.

In embodiments, the high temperature processed (HTP) carbon can be prepared, for example, by: a first heating of a coconut shell sourced carbon at from about 1000 to about 1700° C. for from about 0.5 to about 5 hrs in an inert atmosphere; and grinding the resulting carbon to a powder. Optionally the resulting powder can be washed, such as with an aqueous acid, and a second heating can be accomplished with the acid washed powder at from 1000 to 1700° C.

In embodiments, the electrically conductive substrate supports at least a portion of the carbon composition, the carbon composition supports at least a portion of the lithium composite powder, and the lithium composite powder is embedded in the surface of at least a portion of the carbon composition.

In embodiments, the anode is compressed to imbed the LCP in, for example, from 0.25 to 0.3 wt % based on the total weight of the carbon composition into the anode carbon. However, since the anode or a subsequent LIC is not yet "conditioned", it is not yet "pre-doped" with the compression step, only insertion of the lithium in the carbon structure is achieved. However, no redistribution of the lithium in the carbon structure has been achieved beyond reapportioning of the coating layers associated with the compression step. Redistribution of the lithium is accomplished by the conditioning step. The insertion of lithium in the carbon structure from compression, and the redistribution of the lithium in the carbon structure from conditioning taken together describe the disclosed pre-doping of the method.

In embodiments, the lithium composite particle powder embedded in the surface of at least a portion of the carbon composition is a source of lithium ions.

In embodiments, the abovementioned anode can comprise, for example:
the electrically conductive substrate is a metallic foil or graphite;
the carbon is a heat treated carbon in from 85 to 95 wt %;
the conductive carbon black is in from 1 to 8 wt %; and
the conductive binder is a polyvinylidene difluoride (PVDF) in from 1 to 10 wt %; and
the lithium composite powder (LCP) is present in from 0.25 to 0.3 wt %, based on the total weight of the carbon composition, comprising:
a core comprising a lithium metal; and
a shell on the core comprising a lithium salt, a shell binder, and an oil.

The present disclosure is advantaged is several aspects, including for example:
providing a rapid method for pre-doping an LIC (i.e., activating for typical use; including compressing and conditioning);
providing an order of magnitude reduction in the time needed for pre-doping an LIC; and
providing an LIC activation protocol having reduced time and simple construction protocol for accomplishing lithium ion insertion on the carbon coated anode surface.

In embodiments, the disclosure provides a pre-doped lithium ion capacitor having an anode based on hard carbon and a cathode based on activated carbon. The method of making the lithium ion capacitor includes, for example, pre-doping an LIC including: compressing for from 1 to 45 mins an LIC structure having a lithium composite particle (LCP) coating on a carbon coated anode to achieve lithium ion insertion into the carbon coated anode; and conditioning at from a 4C to C/20 rate. In contrast to the lithium ion insertion and conditioning process disclosed in the aforementioned US 2014/0313639, which inserts lithium ion in the anode electrochemically and conditions in from 72 to 144 hrs, pre-doping of the presently disclosed lithium ion capacitor can be accomplished in from 1 to 45 mins.

Referring to the Figures, FIG. 1 shows the conditioning data for lithium ion capacitors conditioned at C/10, C/2, C/20, and 1C rate. FIG. 1 shows the discharge capacity for the cells conditioned at different rates. The discharge capacity is calculated by normalizing the discharge capacity of the cell to the weight of the anode carbon. In the conditioned cells of FIG. 1, lithium was inserted in the anode carbon structure by applying mechanical pressure on the lithium ion capacitor prior to electrical conditioning. FIG. 1 demonstrates that the rate of conditioning did not make a significant difference on the normalized discharge capacity. The lithium ion capacitor conditioned at C/20 showed similar discharge capacity when conditioned at 1C, C/10, and C/2, which indicates that the presently disclosed lithium ion capacitor can be conditioned at faster rates, such as, as high as 1C. The lithium ion capacitor conditioned at C/2 showed a discharge capacity of 69.29 mAh/g on the first cycle. A lithium ion capacitor conditioned at C/10 showed a discharge capacity of 72.86 mAh/g on the first cycle. A lithium ion capacitor conditioned at C/20 showed a discharge capacity of 66.87 mAh/g on the first cycle. A lithium ion capacitor conditioned at 1C showed a discharge capacity of 68.33 mAh/g on the first cycle. The conditioning can involve the charging of the lithium ion capacitor for 1 hr, holding the lithium ion capacitor at an upper voltage (e.g., 3.8V) for 1 hour, and discharging the lithium ion capacitor in 1 hr. Also, a significant change in the discharge capacity is not seen from the first cycle to the fifth cycle for C/20, C/10, C/2, and the 1C rate conditioning. This data suggests that the conditioning could be done with just 1 cycle at any rate. Therefore, the presently disclosed lithium ion capacitor can be conditioned at a significantly faster rate without any penalties in performance.

Figure 2:
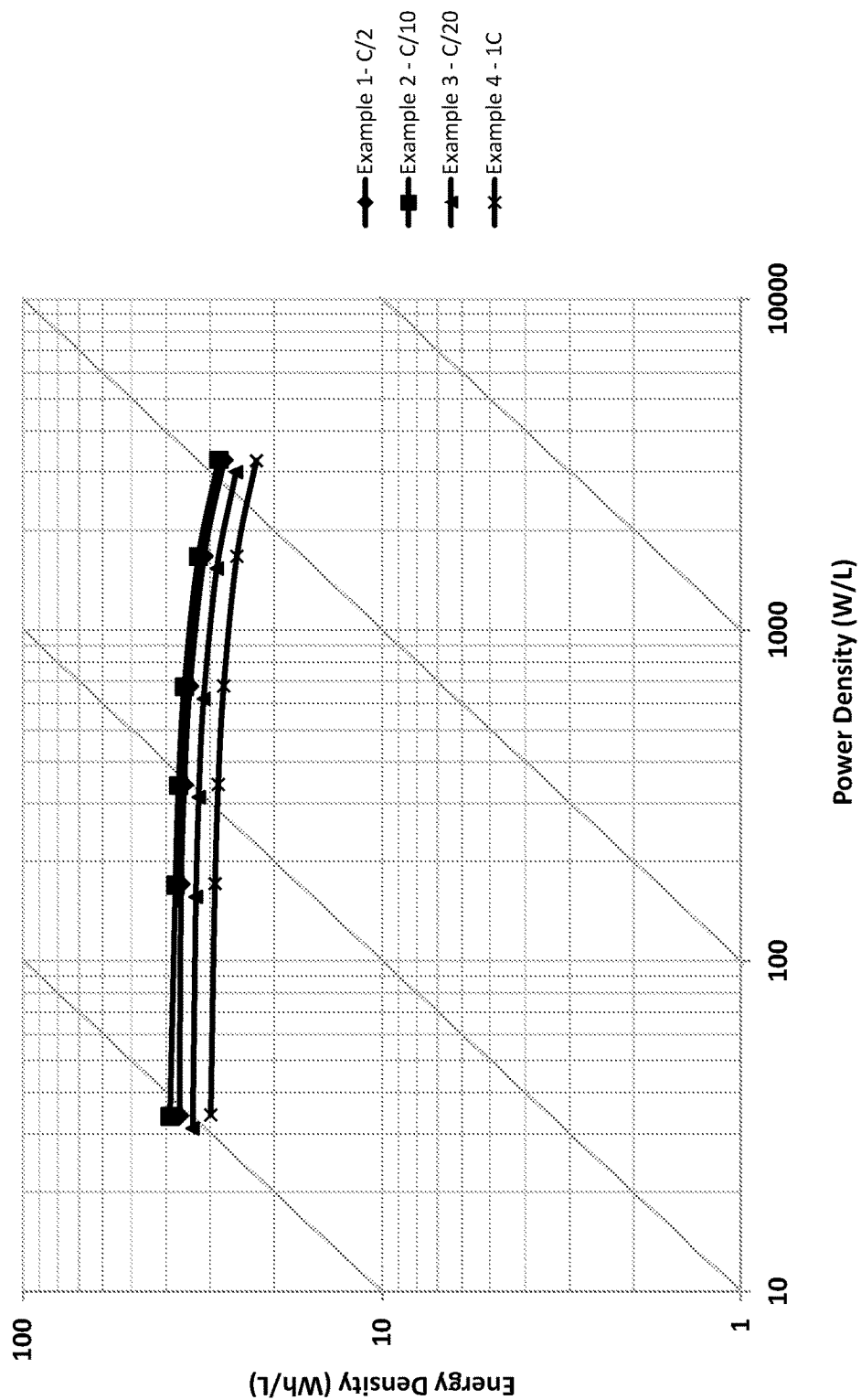
FIG. 2 shows a volumetric Ragone plot for the inventive LICs conditioned at C/2, C/10, and C/20 rate for Examples 1 to 4.

FIG. 2 shows the volumetric Ragone plot for the cells conditioned at C/2, C/20, C/10, and 1C rate. The disclosed lithium ion capacitors showed no significant difference when tested at low, medium, and high rates. The lithium ion capacitor conditioned at C/2 showed an energy density of 27.40 Wh/l at a 100C rate. The lithium ion capacitor conditioned at C/10 showed an energy density of 28.41 Wh/l at a 100C rate. The lithium ion capacitor conditioned at C/20 showed an energy density of 25.48 Wh/l at 100C rate. The lithium ion capacitor conditioned at 1C showed an energy density of 22.37 Wh/l at a 100C rate.

The pressure and time for the compression step to achieve insertion of lithium in the anode carbon structure can be, for example, from 50 to 1000 psi. In embodiments, the pressure can be, for example, 10, 20, 30, 100, 200, 400, 500, 700, 900, or 1000 psi, including intermediate values and ranges. The compression times under pressure can be, for example, from 0.1 to 60 mins, including intermediate values and ranges. In embodiments, the compression time under pressure can be, for example, 0.1, 1, 2, 5, 10, 20, 30, 45, 50, 60, or 100 mins, including intermediate values and ranges.

Figure 3A:
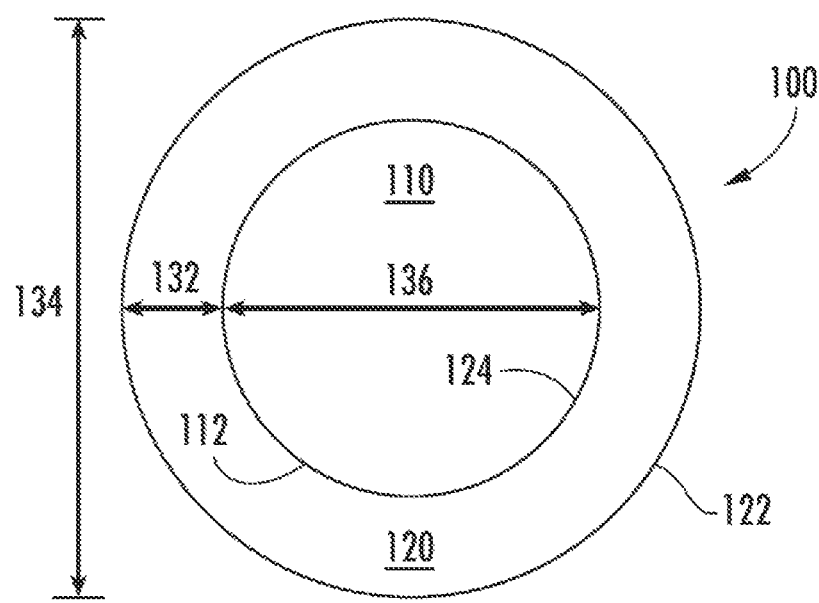
FIGS. 3A, 3B, and 3C, respectively, show a cross-sectional schematic of an exemplary encapsulated lithium particle (3A) (lithium composite particle powder; LCP), an exemplary anode electrode structure having a surface layer of the disclosed encapsulated lithium particles (3B) prior to compression, and an exemplary anode inventive electrode structure having a pre-doped surface layer of the encapsulated lithium particles embedded on or impregnated into the surface of the carbon coated electrode (3C).

FIG. 3A is a schematic diagram of an exemplary encapsulated lithium composite particle (LCP) (100) (not to scale). Particle (100) includes a core (110) and a shell (120) that encapsulates the core. The core (110) can comprise a unitary body defining an outer surface (112). The shell (120) is in direct physical contact with the outer surface (112) of the core (110) along an inner surface (124) of the coating (120). The shell coating comprises a compatible inorganic or organic salt, an oil, and optionally a binder.

In embodiments, the core (110) comprises elemental lithium metal. In embodiments, the core can comprise an alloy of lithium. Examples of such alloys comprise lithium and one or more of Al, Si, Ge, Sn, Pb, Bi, or mixture thereof.

In embodiments, the shell (120) comprises a lithium salt that can include, for example, $LiPF_6$, $LiBF_4$, $LiClO_4$, $LiAsF_6$, $LiCF_3SO_3$, lithium bis-oxalatoborate, lithium fluoro-oxalatoborate, and like salts, or mixtures thereof. A lithium salt can be any ionic compound comprising lithium and an additional metal, metalloid, or non-metal atom that does not itself ionize and which is soluble or dispersible in a suitable LCP formulating solvent. For instance, $LiPF_6$ contains lithium and phosphorus as metal atoms, but where the phosphorus does not ionize by itself. Rather, the phosphorus ionizes as the $PF_6^-$ ion. In a further example, $LiBF_4$ contains lithium metal and the metalloid boron. Although lithium ionizes ($Li^+$), boron does not ionize by itself, but as the $BF_4^-$ ion. In another example, $LiClO_4$ contains lithium metal and the non-metal atoms chlorine and oxygen. The non-metal atoms ionize as the perchlorate ion ($ClO_4^-$). A suitable LCP formulating solvent can be, for example, selected from THF, methylene chloride, toluene, diethyl ether, monoglyme, diglyme, n-methyl pyrolidinone, dimethyl acetamide, dimethyl formamide, and like solvents, or a mixture thereof.

In embodiments, the method of making the encapsulated particles is preferably accomplished entirely below the melting point of lithium.

Lithium salts, including complex lithium salts, can be used in lithium-ion batteries and lithium-ion capacitors as components of a liquid electrolyte. The complex lithium salts can be dissolved in a solvent to form an electrolyte solution for use in conjunction with an electrochemical device. Example solvents for forming an electrolyte include organic solvents or mixtures of organic solvents such as dimethyl carbonate, methyl propionate, ethylene carbonate, propylene carbonate, and other solvents suitable for use in an electrolyte where the lithium ion is the charge carrier.

The oil can be selected, for example, from the group consisting of a mineral oil, a transformer oil or insulating oil, a silicone oil, a silicone-based oil, a fluorinated hydrocarbon, a vegetable based oil, white oil, liquid paraffin, pariffinum liquidum, liquid petroleum, and like oils, or combinations thereof. Other mineral oil names include white oil, liquid paraffin, pariffinum liquidum, and liquid petroleum. There are three basic classes of refined mineral oils: paraffinic oils, based on n-alkanes; naphthenic oils, based on cycloalkanes; and aromatic oils, based on aromatic hydrocarbons. Pentaerythritol tetra fatty acid natural and synthetic esters are a common mineral oil alternative.

Referring again to FIG. 3A, the core (110) has a particle size (136), and the encapsulated lithium particle (100) has a particle size (134). "Particle size" refers to the maximum linear dimension associated with a particle. For a spherical particle, for example, the particle size is the diameter. For an oblong particle, the particle size is the "length" of the particle. An example average particle size for a plurality of encapsulated particles (100) can be, for example, from about 1 to 500 microns, such as 5, 10, 20, 50, 100, 150, 200, 300, 400, and 500 microns, including intermediate values and ranges, and can be defined for a given material batch over a range of any two of the aforementioned values.

The shell (120) can have a thickness (132) defined as the average shortest distance between the inner surface (124) of the shell and the outer surface (122) of the shell. In embodiments, the shell can have a substantially uniform thickness or a variable thickness depending, for example, on the method used to form the shell. An example average thickness for the shell (124) can be from about 10 nm to 100 microns, such as 0.01, 0.02, 0.05, 0.1, 0.2, 0.5, 1, 2, 5, 10, 20, 50, and 100 microns, including intermediate values and ranges, which can be defined for a given material batch over a range of any two of the aforementioned thickness values.

In embodiments, the encapsulated lithium particle (100) can further comprise a shell having a binder selected from, for example, the polymer group consisting of a styrene butadiene rubber (SBR), an acrylic polymer, a polyvinylidinefluoride (PVDF), a polyethyleneoxide (PEO), a polyethyleneimine (PEI), a polysiloxane, or a combination thereof, and the binder can be present, for example, in an amount from to 0.1 to 2 wt % based on the total weight of the particle.

In embodiments, the encapsulated lithium particle (100) can be substantially spherically shaped. However, other shapes are contemplated, including, for example, asymmetric shapes, spheroids, fused or twined spheroids (e.g., a peanut shape), popcorn shape (e.g., minor agglomerates of the particles), and like shapes, or mixtures thereof. The encapsulated lithium particles (100) are substantially non-reactive or non-combustive if exposed to air, oxygen, or water. The shell (120) encapsulates the lithium core (110) to substantially inhibit or prevent exposure and reaction of the lithium with ambient gases or liquids. The encapsulated lithium particles (100) can be substantially chemically inert, for example, to ambient exposure or to elevated temperature (e.g., 50, 100, 150, or even 200° C.) exposure to air, oxygen, water vapor, or a combination thereof. The encapsulated lithium particles may be sufficiently stable to be stored in air for at least one week, 2 weeks, 1 month, or even a year, without substantial chemical degradation, combustion, or both.

In embodiments, the disclosure provides a method of making the above mentioned encapsulated lithium particle, comprising, for example:

contacting lithium-containing core particles and a shell source material comprising a complex lithium metal salt, an oil, and a solvent; and removing the solvent to produce the particles comprising a lithium-containing core and a shell encapsulating the core, the shell comprising the complex lithium metal salt and the oil.

In embodiments, the core can consist essentially of elemental lithium metal.

In embodiments, the encapsulated lithium composite particles can be made by contacting lithium metal particles with a shell source material that includes a lithium metal salt, an oil, and a binder, dissolved in a LCP formulating solvent. The shell source material can include a lithium salt or complex lithium salt as described above. The contacting can be performed by immersing the lithium core particles in the shell source material solution or by other means such as spray coating. After coating the particles with the shell source material, the LCP formulating solvent is removed to form a layer or shell over the lithium metal particles. Removal of the LCP formulating solvent can be performed by, for example, evaporation, centrifugation, and like suitable methods.

Due to its high reactivity and flammability, lithium metal is commonly stored under the cover of a viscous hydrocarbon such as mineral oil. While the mineral oil encapsulant inhibits degradation of the lithium metal, it is generally incompatible with most solid state devices. With the present stabilization approach, the lithium particles are safe to handle and store, and can be incorporated into a lithium ion device directly in their stabilized form since the oil component is encapsulated within the shell and does not interfere with the device.

In embodiments, encapsulated lithium particles can be produced by initially providing lithium metal or lithium metal-containing particles that are immersed in oil. By way of example, the oil can comprise silicone oil. Lithium metal particles suspended in silicone oil are commercially available from Sigma-Aldrich, St. Louis, Mo.

A vacuum filtration system, for example, can be used to wash the lithium particles. Due to the volatility of the lithium, both the washing to remove an organic solvent and contacting the lithium metal particles with the shell source material comprising a lithium metal salt to form the inorganic shell can be carried out in a controlled atmosphere such as a glove box that is free or substantially free of oxygen and water. Prior to contacting the lithium metal particles with the shell source material, the washed lithium particles can be dried in an inert atmosphere. The washed particles can be dried by heating the particles to evaporate the solvent, e.g., up to about 100° C.

To form the inorganic shell, a lithium salt, an oil, and an optional binder, are initially dissolved in a LCP shell coating solvent to form a shell source material solution. Suitable dry, degassed, or both, LCP shell coating solvents that are capable of dissolving the lithium salt include, for example, THF, n-methyl pyrrolidone (NMP), methylene chloride, and like solvents, or combinations thereof.

After contacting the lithium particles with the solution of the shell source material the shell coating solvent can be removed to form a shell of the lithium salt over the core particles. The shell coating solvent can be removed by, for example, evaporation, which may either occur naturally under environmental conditions of the preparation method or may be accelerated through various techniques including application of vacuum. For example, THF may be liberated through evaporation at room temperature and with no vacuum. In a further example, NMP may be removed by heating optionally with the application of vacuum. In embodiments, removal of the shell coating solvent can be performed at room temperature or by heating to at most about 150° C., e.g., about 30, 50, 75, or 100° C., including intermediate values and ranges. In embodiments, contacting and removing are performed at from 15° C. to 150° C.

The thickness (132) of the shell coating (120) shown in FIG. 3A can be determined by controlling the concentration of the lithium salt in the shell coating solution. Generally, a higher salt content in the solution will produce a thicker shell coating. A concentration in the shell coating solution of the lithium salt can be from about 0.1 to 4 molar, e.g., 0.1, 0.2, 0.5, 1, 2, 3, or 4 molar (M). In embodiments, the shell coating solution comprises a saturated solution of the lithium salt, an oil, and an optional binder.

In the resulting encapsulated lithium particles, the lithium salt shell can comprise from about 1 to 50 wt. % of the total mass of the particles. For instance, the shell coating can comprise, e.g., 0.1, 0.5, 1, 2, 5, 10, 20, 30, 40, or 50 wt. % of the total encapsulated particle mass including intermediate values and ranges. Together with the core particle composition, this thickness of the shell is selected to provide an effective barrier to the diffusion of air, oxygen, and water.

In the resulting encapsulated lithium particles, the oil can be present in from 0.1 to 30 wt % based on the total weight of the shell. In the resulting encapsulated lithium particles, the oil can be present in from 0.01 to 15 wt % based on the total weight of the particles.

In embodiments, the disclosure provides an electrode article, comprising:

a mixture of the aforementioned encapsulated lithium particles and a binder deposited on at least a portion of the surface of a carbon electrode.

In embodiments, the disclosure provides a method of making a lithium electrode article, comprising:

spraying a mixture comprised of the aforementioned encapsulated lithium particles comprising a lithium containing core, and a shell comprising a lithium salt, an oil, a binder, and an organic solvent, onto at least a portion of the surface of a carbon electrode.

In embodiments, the spraying of the mixture of the encapsulated lithium particles can be accomplished, for example, at from 0 to 200° C. The resulting sprayed mixture on at least a portion of the surface of a carbon electrode can optionally be dried for from 1 min to 12 hrs.

In embodiments, the disclosure provides a method of making a coated electrode having ambient environmentally stable encapsulated lithium particles comprising:

coating on a anode (i.e., a negative electrode), a slurry mixture including a lithium metal particle powder dispersed in a solution of lithium complex salt, a mineral oil, and styrene butadiene rubber (SBR) binder, in an organic solvent to form a coat of lithium salt, mineral oil, and a binder, on the lithium metal powder in situ and then coating the slurry on the electrode.

The encapsulated lithium powder thus formed on the anode/negative electrode consists of a core encapsulated and surrounded by a protective coating of $LiPF_6$ and mineral oil. The core of the encapsulated lithium powder consists of lithium metal or lithium metal alloy with some other metal, for example, selected from the group of metals consisting of aluminum, silicon, germanium, tin, lead, bismuth, or combination thereof. The protective coating consists of a lithium salt, an oil, and an optional binder, and encapsulates and surrounds the lithium metal or lithium metal alloy core. The coating acts as a barrier between the ambient conditions and the core. The lithium metal core would react violently if not encapsulated and surrounded by the protective lithium salt and oil. The styrene butadiene rubber (SBR) acts as a binder which holds and helps in adhesion of the encapsulated lithium powder to the surface of anode/negative electrode. The single-step coating method can be accomplished by various coating procedures such as spray coating or dip coating. The disclosed single step method of coating an electrode involves the formation of the protective coating around the lithium metal powder in situ while coating the surface of an anode/negative electrode with a slurry mixture of a lithium metal powder dispersed in solution of the lithium salt, the oil, and an optional binder, in an organic solvent.

Mineral oil is one example of many oils that can be used. Different grades of mineral oil can be used as the oil component for shell (i.e., the outer protective coating). Mineral oils which are colorless, odorless, light mixtures of alkanes of from $C_{15}$ to $C_{40}$ can be selected. The core particle has a reactive and unstable lithium based core, which is coated with a protective coating mixture of a lithium salt, an oil, and an optional a binder. The lithium salt and oil protects the inner lithium based core from being exposed to the ambient conditions and avoids violently reacting with the ambient conditions. Since mineral oil and like oils are hydrophobic in nature the oil provides a supplementary benefit of repelling moisture in ambient air, which can increase the efficiency of the protective coating on the lithium core.

Figure 3B:
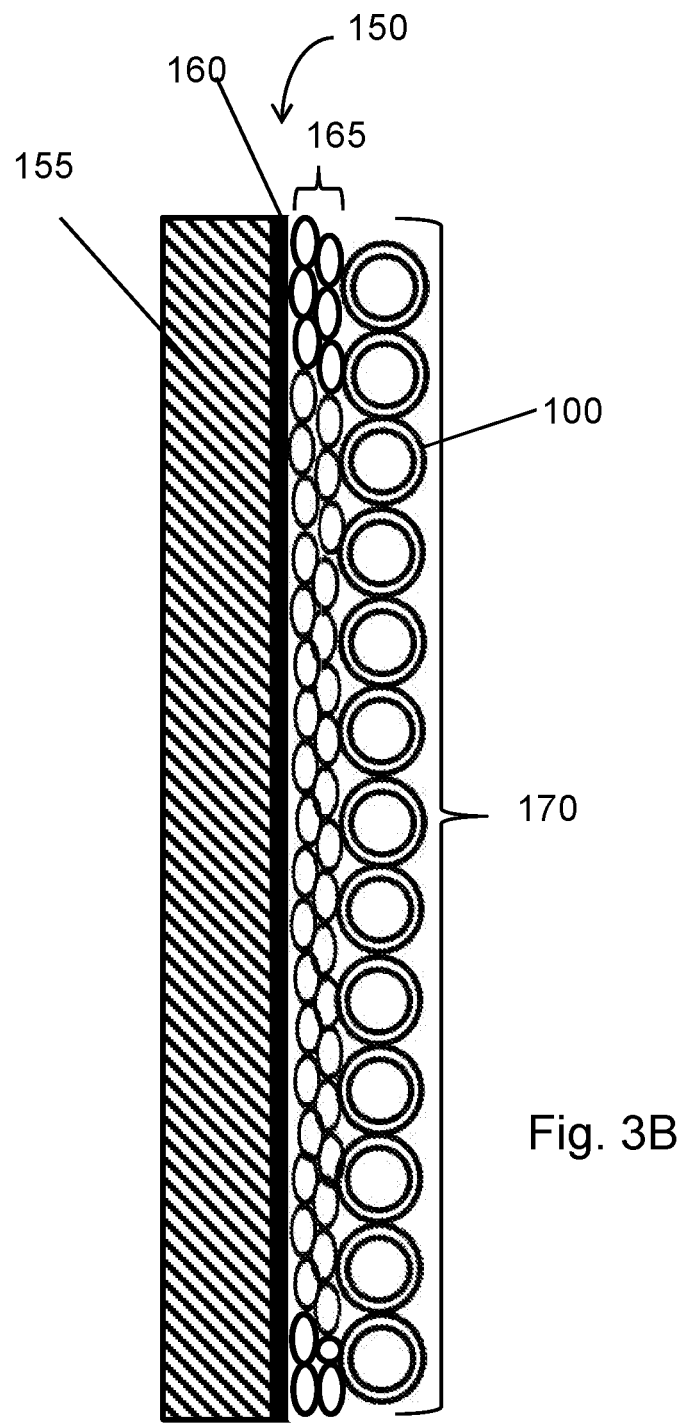

Referring to FIG. 3B, there is provided a schematic (not to scale) in cross-section of an exemplary coated electrode structure (150) having a current collector (155) (e.g., a metal such as Cu or Al), a thin carbon layer (160) (e.g., 1 to 20 microns), a thick carbon layer (165) (i.e., hard carbon particles and a PVDF binder; e.g., a thickness of about 50 to 200 microns such as 100 microns), and a layer (170) including encapsulated Li particles (100) and a binder. The encapsulated Li particles can include a binder in the particle shell and between particles when prepared and applied to the anode structure by the single-step method.

Figure 3C:
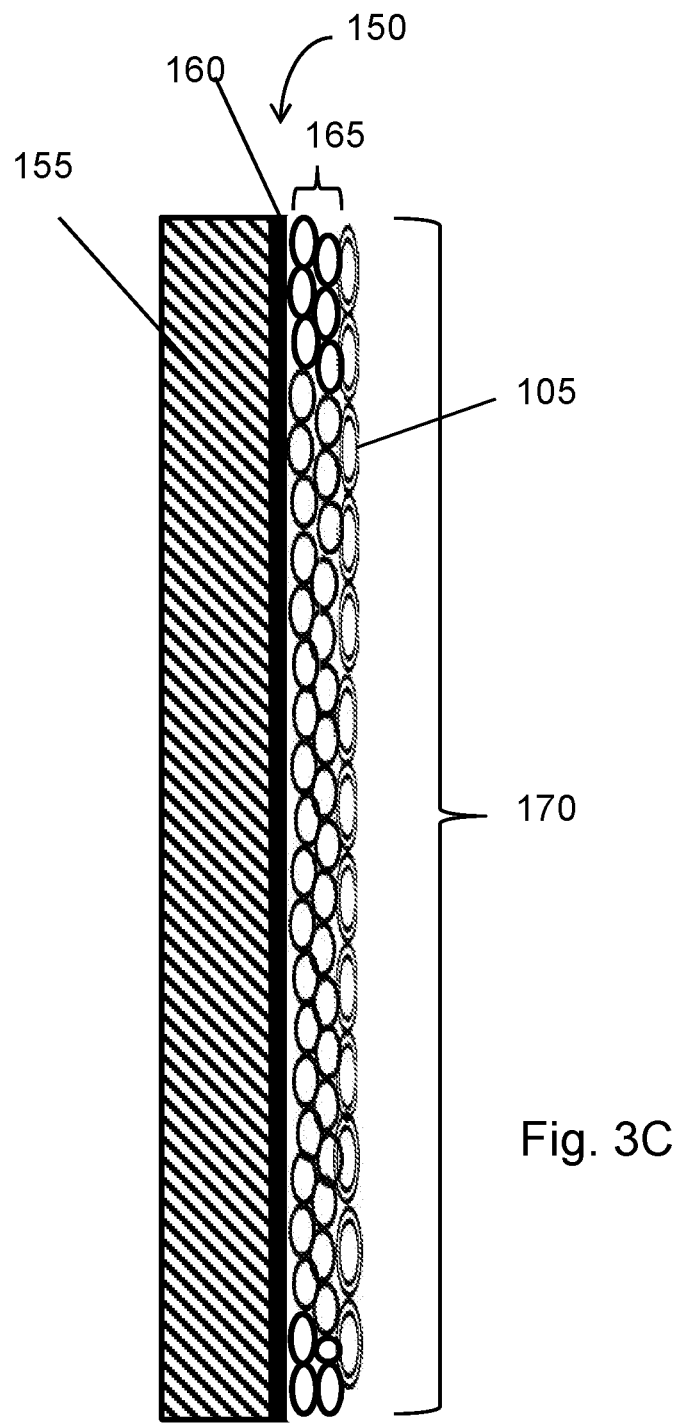

FIG. 3C shows an exemplary coated structure of FIG. 3B having compression and LCP powder (105) compressed onto or into the carbon particle surface (165).

The encapsulated lithium powder formed in situ on the surface of the anode/negative electrode has considerable stability at ambient conditions and at elevated temperatures, such as up to 200° C. An anode/negative electrode coated with the disclosed encapsulated lithium powder is substantially stable when stored in air. The use of a lithium salt and oil as a protective coating provides an additional advantage as the lithium salt can be used as an electrolyte salt in lithium ion devices so the coating does not cause interference in the performance of device. Once in the electrochemical device, the shell coat can readily dissolve in the electrolyte solvent, which solvent can include, for example, ethylene carbonate, propylene carbonate, dimethyl carbonate, diethyl carbonate, methyl propionate, an like other solvents, which are appropriate for use in an electrolyte for a lithium ion charge carrier.

The encapsulated lithium powder can be produced by initially acquiring lithium metal powder dispersed in mineral oil, for example, from Sigma Aldrich, St Louis, Mo. Lithium metal is stable in mineral oil. Prior preparative processes for preparing lithium metal powder for anode surface deposition required stripping all the mineral oil. Alternatively, some of the mineral oil could be washed off the powder while keeping some fraction of the oil on the surface and then the particles could be used for further processing without having to add mineral oil later. All or part of the mineral oil can be stripped from the lithium metal powder by washing the lithium metal powder with an organic solvent such as hexanes, THF, methylene chloride, toluene, and heptane. For efficient washing purposes, the lithium metal powder dispersed in mineral oil should be stirred with an organic solvent such as hexane, heptane, toluene, chloroform, benzene, THF, methylene chloride, diethyl ether, and mixtures thereof, and can be then filtered using a vacuum filtration assembly or gravity filtration assembly. Due to the volatile and reactive nature of the lithium metal powder, the washing of the lithium metal powder with an organic solvent to strip the mineral oil and the single step coating method to form an encapsulated lithium particle powder on the surface of the anode/negative electrode can be carried out in a water free and oxygen free, argon glove box. Other oils such as silicon oil, vegetable oil, or other synthetic or natural oils, can alternatively or additionally, be used in the method with appropriate solvents.

The lithium metal powder free of mineral oil, can be dispersed to form a slurry in a mixture of the lithium salt, the oil, and the binder, dissolved in an organic solvent. The slurry can be coated on the anode/negative electrode using, for example, spray coating or dip coating. The coated anode/negative electrode can be dried at, for example, 120° C. under vacuum to remove the organic solvent.

The thickness of the protective shell on the lithium metal powder can vary depending on the concentration of the lithium salt and oil. The higher the concentration of the salt, the thicker is the protective coating on the lithium metal based core. The coating solution, which consists of lithium salt and an oil in an organic solvent is generally a saturated solution of the lithium salt and oil.

In embodiments, the disclosure provides a composite electrode, made according to the disclosed method. The composite electrode was demonstrated for use in a lithium ion energy storage device. In embodiments, the electrode consists of, for example, a metallic current collector having two or more coatings. A first coating layer adjacent to the current collector can be, for example, a low surface area carbon material, a binder, and a carbon black. A second layer on the first layer can be, for example, the disclosed encapsulated lithium particle powder comprising lithium metal core particles coated with an encapsulating or encapsulant mixture of a lithium salt and an oil.

In embodiments, the disclosure provides a method to create a layer containing encapsulated lithium particles on the surface of an electrode structure. In embodiments, the disclosure provides a single step method for generating a protective coat or capsule around the lithium metal core particles in situ and coating of the surface of an anode/negative electrode with the resulting slurry mixture containing the encapsulated lithium particles. The lithium metal powder is first dispersed in a solution of a suitable lithium salt, an suitable oil, and optionally a suitable binder, for example, a polymer such as SBR, in an organic solvent, to form the encapsulated lithium particles in situ. The resulting mixture containing the encapsulated lithium particles can be used directly to deposit the encapsulated lithium particles on the surface of an anode structure.

In embodiments, the disclosed LIC device and method of using can further comprise using the device in combination with another system having a need for storage, supply, or both, of energy, power, or both, for example, at least one of: a vehicle, an electronic appliance, a wind turbine, a wave-action turbine, an electrical or power grid system, or a combination thereof. A vehicle can be, for example, a mobile machine that transports, for example, people, cargo, or a purposeful payload, such as camera or an military ordinance in a drone or unmanned aerial system (UAS). Other examples of vehicles are wagons, bicycles, motor vehicles (e.g., motorcycles, cars, trucks, buses, trains), watercraft (e.g., ships, boats), spacecraft, aircraft, or combinations thereof.

EXAMPLES

The following Examples demonstrate making, use, and analysis of the disclosed articles and methods in accordance with the above general procedures.

Example 1

Anode Preparation

Coconut shell flour 200 mesh was acquired from Reade Materials. The flour was then carbonized to 1200° C. for 2 hrs under nitrogen. The resulting carbon was then ground to 5 micron particle size. The ground carbon was then washed with 1N HCl for 16 hrs followed by washes with distilled water to pH 5. The carbon was then heat treated to 1600° C. for 2 hrs under nitrogen. The resulting heat treated carbon was used in casting anode electrodes for a lithium ion capacitor. The anode electrode coating consisted of 90 wt % of the heated treated coconut shell flour carbon, 5 wt % Timcal Super C-45 conductive carbon, and 5 wt % of KYNAR 761 PVDF (molecular weight: 300,000 to 400,000) as a binder and was formulated as follows. A mixture of 3.6 grams of the heated treated coconut shell flour carbon and 0.2 grams of Timcal Super C-45 were balled milled in a Retsch PM-100 ball mill for 15 mins at 350 rpm. 0.2 grams of polyvinylidene difluoride (PVDF) was added to the mixture and ball-milled for an additional 15 mins at 350 rpm. 5 mL of N-methyl pyrrolidinone (NMP) were added to the mixture to form a slurry. The slurry was then coated on both the sides of a copper foil (from Oak Mitsui: TLB-DS) with a 50 G sized coating rod to give a slurry coated anode electrode.

The carbon coated anode was then coated with lithium composite powder (LCP). The weight ratio of the LCP to hard carbon on the anode was from 0.25:1 to 0.3:1. The LCP consisted of an 80 wt % lithium metal powder core, and shell consisting of a mixture of 17.8 wt % $LiPF_6$, and 2.2 wt % mineral oil. 0.5 wt % (based on the total weight of solids) styrene butadiene rubber (SBR), as binder, was added to the LCP to adhere the mixture to the surface of the anode electrode. The LCP was deposited on the surface by spray coating from a mixture in THF solvent. However, the LCP can be deposited on the surface of the anode by alternative approaches such as by dip coating, and like methods. The LCP was used to pre-dope the anode electrode to the desired open circuit voltage (OCV). The LCP coated anode electrode was dried under vacuum at 120° C. The LCP composition and preparative process is disclosed in commonly owned and assigned U.S. Ser. No. 14/493,886, filed Sep. 23, 2014, entitled "Encapsulated Lithium Particles and Methods of Making and Use Thereof."

Cathode Preparation

Cathode carbon was made from a wheat flour source as the precursor and carbonized at 800° C. The carbonized carbon was ground to a particle size of approximately 5 microns. The ground carbonized carbon was then activated at 900° C. with KOH (alkali) at a ratio of 2.2:1 KOH:carbon for 2 hrs. The carbon was further washed with water to remove any remaining KOH. The resulting alkali activated carbon was then treated with aqueous HCl to neutralize any trace of KOH and then washed with water to a neutral pH. The alkali activated carbon was then heat-treated under nitrogen/forming gas at 900° C. for 2 hrs. The resulting "carbon-1" ("Corning carbon") sample was used to make carbon coated cathodes. The cathode electrode coating consisted of 92.5 wt % of the carbon-1, 5 wt % of PVDF (KYNAR HSV 900), and 5 wt % of Timcal Super-C-45 conductive carbon and was formulated as follows. A mixture of the 3.7 gms of the carbon-1 and 0.1 gms of the conductive carbon was mixed in a ball mill for 10 mins at 350 rpm. 0.2 gms of the PVDF was added and the mixture was ball milled for another 10 mins at 350 rpm. 11 mL of NMP solvent was added to the mixture and then ball milled for another 10 mins at 350 rpm to form a slurry mixture. The slurry was then coated on TOYO current collector that was previously treated with 5 vol % FluoroEtch® Safety Solvent (sodium naphthalide in glycol ether from Acton Technologies) in tetrahydrofuran, to yield a 7 mil coating thickness on the TOYO current collector.

LIC Construction

Two double sided coated anodes (/A/) were coupled on opposite sides with two single sided coated cathodes (C/) and one double sided coated cathode (/C/) and each electrode separated by an NKK-4425 separator (S) to form a LIC of the schematic formula: C/S/A/S/C/S/A/S/C. The LIC stack was then enclosed in a pouch sealed on three sides. The pouch was filled with 5 mL non-aqueous electrolyte consisting of 1.25 M $LiPF_6$ in a 1:1:3 volume ratio mixture of ethylene carbonate:dimethyl carbonate:methyl propionate, and 5 wt % fluoroethylene carbonate by superaddition. The fourth side of the pouch was then sealed under vacuum. The resulting LIC structure was compressed under 230 pounds per square inch (psi) (1 psi=6895 Pa) of pressure using a Carver hydraulic lab press (Model No. 4386) to short-circuit the lithium metal in the LCP into the anode carbon. The pressure was held at 230 psi until the open circuit voltage of the anode against the cathode was about 2.85 V. The shorting of the lithium on the anode carbon takes approximately 5 to 10 mins to generate a satisfactory level of lithium ions, such as a concentration from 1 to 99% of the available lithium ions.

C/2 Conditioning

The resulting compressed LIC was electrochemically conditioned at a C/2 rate where the cell was charged at a C/2 rate from the OCV to 3.8V, held at 3.8V for 1 hr, and then discharged at a C/2 rate. The conditioning cycle was repeated five times. The cells were then tested at constant current charge and different discharge currents (Ragone Plot). The fifth conditioning cycle gave a discharge capacity of 69.47 mAh/gm (normalized to the weight of carbon on anode). The normalization involved dividing the total capacity of the cell from the fifth conditioning cycle by the weight of the carbon present on the anode. The C-Rate test (Ragone plot) showed an energy density of 36.58 Wh/l at 1C discharge rate.

Example 2

C/10 Conditioning

The LIC in this example was built and tested with the same protocol as in Example 1 with the exception of a different conditioning rate. The resulting LIC was conditioned at a C/10 rate where the cell was charged at a C/10 rate from OCV to 3.8V, held at 3.8V for 1 hr, and then discharged at a C/10 rate. The conditioning cycles were repeated five times. The cells were then tested at constant current charge and different discharge currents (Ragone Plot). The fifth conditioning cycle gave a discharge capacity of 74.00 mAh/gm (normalized to the weight of carbon on anode). The C-Rate test (Ragone plot) showed an energy density of 38.86 Wh/l at a 1C discharge rate.

Example 3

C/20 Conditioning

The LIC in this example was built and tested with the same protocol as Example 1 with the exception of a different conditioning rate. The resulting LIC was conditioned at C/20 rate where the cell was charged at C/20 rate from OCV to 3.8V, held at 3.8V for 1 hr, and then discharged at a C/20 rate. The conditioning cycles were repeated five times. The cells were then tested at constant current charge and different discharge currents (Ragone Plot). The fifth conditioning cycle gave a discharge capacity of 65.27 mAh/gm (normalized to the weight of carbon on anode). The C-Rate test (Ragone plot) showed an energy density of 33.61 Wh/l at 1C discharge rate.

Example 4

1C Conditioning

The LIC in this example was built and tested with the same protocol as Example 1 with the exception of a different conditioning rate. The resulting LIC was conditioned at 1C rate where the cell was charged at a 1C rate from OCV to 3.8V, held at 3.8V for 1 hr, and then discharged at a 1C rate. The conditioning cycles were repeated five times. The cells were then tested at constant current charge and different discharge currents (Ragone Plot). The fifth conditioning cycle gave a discharge capacity of 67.64 mAh/gm (normalized to the weight of carbon on anode). The C-Rate test (Ragone plot) showed an energy density of 29.95 Wh/l at a 1C discharge rate. A lithium ion capacitor that was compressed and conditioned in as little as 3.5 hrs was demonstrated.

Example 5

1C Conditioning

The LIC in this example was built and tested with the same protocol as Example 1 with the exception that the constructed LIC was compressed with greater pressure and used 1C Conditioning. The constructed LIC compressed under 556 psi instead of 230 psi with a Carver hydraulic lab press (Model No. 4386) to short-circuit the lithium metal in the LCP on the anode carbon. The pressure was held at 556 psi until the open circuit voltage of the anode against the cathode was about 2.85 V. The shorting of the lithium metal on the anode carbon took approximately 2 to 5 mins. The resulting LIC was conditioned at a 1C rate where the cell was charged at a 1C rate from OCV to 3.8V, held at 3.8V for 1 hr, and then discharged at a 1C rate. The conditioning cycles were repeated five times. The cells were then tested at constant current charge and different discharge currents (Ragone Plot). The fifth conditioning cycle gave a discharge capacity of about 73.42 mAh/gm (normalized to the weight of carbon on the anode). The C-Rate test (Ragone plot) showed an energy density of 30.01 Wh/l at a 1C discharge rate.

Comparative Example 6

Example 1 was repeated with the exception that the resulting LIC structure was not compressed prior to conditioning. The fifth conditioning cycle gave a discharge capacity of 53.47 mAh/gm. The C-rate test showed an energy density of 24.29 Wh/l at a 1C discharge rate.

Table 1 provides a listing of energy density and discharge capacity results measured for the examples.

TABLE 1

Listing of energy density and discharge capacity for examples.

| Example | energy density (Wh/l at a 1 C) | discharge capacity (mAh/gm) |
|---|---|---|
| Ex. 1 | 36.58 | 69.47 |
| Ex. 2 | 38.86 | 74.00 |
| Ex. 3 | 33.61 | 65.27 |
| Ex. 4 | 29.95 | 67.64 |
| Ex. 5 | 30.01 | 73.42 |
| Comp. Ex. 6 | 24.29 | 53.47 |

The disclosure has been described with reference to various specific embodiments and techniques. However, many other variations and modifications are possible while remaining within the scope of the disclosure.

What is claimed is:

1. An anode in a lithium ion capacitor, comprising:
    an electrically conductive substrate;
    a carbon composition comprising:
        a high temperature carbon processed at from 1000 to 1700° C.;
        a conductive carbon; and
        a conductive binder; and
    a lithium composite powder (LCP),
    wherein the electrically conductive substrate supports at least a portion of the carbon composition, the carbon composition supports at least a portion of the lithium composite powder, and the lithium composite powder is impregnated or embedded in the surface of at least a portion of the carbon composition.

2. The anode of claim 1 wherein the lithium composite powder impregnated or embedded in the surface of at least a portion of the carbon composition is a source of lithium ions.

3. The anode of claim 1 wherein:
    the electrically conductive substrate is a metallic foil or a graphite;
    the high temperature carbon is present in from 85 to 95 wt %;
    the conductive carbon is a carbon black in from 1 to 8 wt %; and
    the conductive binder is a polyvinylidene difluoride in from 1 to 10 wt %; and the lithium composite powder (LCP) is present in from 0.25 to 0.3 wt %, based on the total weight of the carbon composition, the LCP comprising:
a core comprising a lithium metal; and
a shell on the core comprising a lithium salt, a shell binder, and an oil.

* * * * *

UNITED STATES PATENT AND TRADEMARK OFFICE
CERTIFICATE OF CORRECTION

PATENT NO. : 9,928,969 B2  
APPLICATION NO. : 15/684050  
DATED : March 27, 2018  
INVENTOR(S) : Kishor Purushottam Gadkaree et al.

Page 1 of 1

It is certified that error appears in the above-identified patent and that said Letters Patent is hereby corrected as shown below:

On the Title Page

Page 2, Column 2, item [56], Line 11, delete "flouride)" and insert -- fluoride) --, therefor.

Page 2, Column 2, item [56], Line 14, delete "flouride)" and insert -- fluoride) --, therefor.

Page 2, Column 2, item [56], Line 16, delete "proccessing" and insert -- processing --, therefor.

Page 2, Column 2, item [56], Line 17, delete "flouride)" and insert -- fluoride) --, therefor.

Signed and Sealed this  
Twenty-ninth Day of March, 2022

Drew Hirshfeld  
*Performing the Functions and Duties of the*  
*Under Secretary of Commerce for Intellectual Property and*  
*Director of the United States Patent and Trademark Office*